(12) United States Patent
Livshiz et al.

(10) Patent No.: US 9,090,245 B2
(45) Date of Patent: Jul. 28, 2015

(54) SYSTEM AND METHOD FOR CONTROLLING THE AMOUNT OF TORQUE PROVIDED TO WHEELS OF A VEHICLE TO PREVENT UNINTENDED ACCELERATION

(71) Applicant: GM Global Technology Operations LLC, Detroit, MI (US)

(72) Inventors: Michael Livshiz, Ann Arbor, MI (US);
Ryan Z. Goode, Howell, MI (US);
Richard B. Jess, Haslett, MI (US);
Michael L. Waterman, Royal Oak, MI (US); Ronald F. Lochocki, Jr., Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 66 days.

(21) Appl. No.: 13/972,275

(22) Filed: Aug. 21, 2013

(65) Prior Publication Data

US 2015/0039193 A1 Feb. 5, 2015

Related U.S. Application Data

(60) Provisional application No. 61/860,307, filed on Jul. 31, 2013.

(51) Int. Cl.
*G06F 7/00* (2006.01)
*B60W 10/06* (2006.01)
(Continued)

(52) U.S. Cl.
CPC ............. *B60W 10/06* (2013.01); *B60W 10/026* (2013.01); *B60W 10/10* (2013.01); *B60W 10/11* (2013.01);
(Continued)

(58) Field of Classification Search
CPC ..... B60W 10/02; B60W 10/06; B60W 10/10; B60W 10/11; B60W 2510/0604; B60W 2510/1005; B60W 2510/0233; B60W 2710/0666; B60W 2710/0677; B60W 2510/0657; Y10T 477/6403; Y10T 477/6407; Y10T 477/6418; Y10T 477/675; Y10T 477/679; Y10T 477/79

See application file for complete search history.

(56) References Cited

U.S. PATENT DOCUMENTS 4,964,318 A 10/1990 Ganoung
5,019,989 A 5/1991 Ueda et al.
(Continued)

FOREIGN PATENT DOCUMENTS

CN 1088520 C 6/1994
CN 1923557 A 3/2007
(Continued)

OTHER PUBLICATIONS

U.S. Appl. No. 13/955,082, filed Jul. 31, 2013, Livshiz et al.
(Continued)

*Primary Examiner* — David D Le

(57) ABSTRACT

A system according to the principles of the present disclosure includes an axle torque determination module, an engine torque determination module, a torque security module, and an engine torque control module. The axle torque determination module determines an axle torque request based on a driver input and a vehicle speed. The engine torque determination module determines an engine torque request based on the axle torque request and at least one of a first turbine speed and whether a clutch of a torque converter is applied. The torque security module determines a secured torque request based on at least one of the driver input, the vehicle speed, and an engine speed. The engine torque control module controls an amount of torque produced by an engine based on one of the engine torque request and the secured torque request.

20 Claims, 3 Drawing Sheets

(51) Int. Cl.
*B60W 10/11* (2012.01)
*B60W 10/02* (2006.01)
*B60W 10/10* (2012.01)

(52) U.S. Cl.
CPC ............... *B60W 2510/0233* (2013.01); *B60W 2510/0657* (2013.01); *B60W 2510/0666* (2013.01); *B60W 2510/1005* (2013.01)

(56) References Cited

U.S. PATENT DOCUMENTS

| | | |
|---|---|---|
| 5,073,865 A | 12/1991 | Togai et al. |
| 5,184,527 A | 2/1993 | Nakamura |
| 5,272,939 A | 12/1993 | Markyvech et al. |
| 5,496,227 A | 3/1996 | Minowa et al. |
| 5,573,476 A | 11/1996 | Minowa et al. |
| 5,625,558 A | 4/1997 | Togai et al. |
| 5,772,555 A | 6/1998 | Minowa et al. |
| 5,776,030 A | 7/1998 | Minowa et al. |
| 5,779,594 A | 7/1998 | Minowa et al. |
| 5,792,021 A | 8/1998 | Minowa et al. |
| 5,954,779 A | 9/1999 | Dietzel |
| 6,090,011 A | 7/2000 | Minowa et al. |
| 6,253,144 B1 | 6/2001 | Yamamura et al. |
| 6,386,180 B1 | 5/2002 | Gerhardt et al. |
| 6,405,587 B1 | 6/2002 | Livshiz et al. |
| 6,466,851 B2 | 10/2002 | Kato et al. |
| 7,463,970 B2 | 12/2008 | Livshiz et al. |
| 7,698,049 B2 | 4/2010 | Whitney et al. |
| 7,704,185 B2 * | 4/2010 | Babcock et al. ................. 477/3 |
| 7,801,658 B2 | 9/2010 | Ohshima |
| 8,195,370 B2 | 6/2012 | Simon, Jr. |
| 8,255,139 B2 | 8/2012 | Whitney |
| 8,635,004 B2 | 1/2014 | Whitney et al. |
| 2001/0056320 A1 | 12/2001 | Kato et al. |
| 2003/0097215 A1 | 5/2003 | Riedle et al. |
| 2004/0034460 A1 | 2/2004 | Folkerts et al. |
| 2005/0148428 A1 | 7/2005 | Cullen et al. |
| 2005/0202924 A1 | 9/2005 | Friedmann et al. |
| 2006/0173602 A1 | 8/2006 | Graf et al. |
| 2007/0067087 A1 | 3/2007 | Ohshima |
| 2008/0220934 A1 | 9/2008 | Babcock et al. |
| 2009/0024263 A1 | 1/2009 | Simon, Jr. et al. |
| 2009/0182478 A1 | 7/2009 | Whitney et al. |
| 2010/0280738 A1 * | 11/2010 | Whitney et al. ............... 701/102 |
| 2011/0118955 A1 | 5/2011 | Livshiz et al. |
| 2011/0144887 A1 | 6/2011 | Whitney et al. |
| 2011/0178691 A1 * | 7/2011 | Wang et al. .................. 701/102 |
| 2011/0257854 A1 | 10/2011 | Whitney et al. |
| 2012/0234123 A1 * | 9/2012 | Whitney et al. .............. 74/473.1 |
| 2012/0265421 A1 | 10/2012 | Livshiz et al. |
| 2013/0080023 A1 * | 3/2013 | Livshiz et al. ................ 701/102 |
| 2013/0325233 A1 * | 12/2013 | Whitney et al. ................ 701/22 |

FOREIGN PATENT DOCUMENTS

| | | |
|---|---|---|
| CN | 101450629 | 6/2009 |
| DE | 102006000431 A1 | 3/2007 |
| DE | 102008039574 A1 | 6/2009 |
| EP | 0578399 A2 | 1/1994 |
| IN | 1495KOL2008 | 1/2008 |
| JP | 2003048461 A | 2/2003 |
| JP | 2004100528 A | 4/2004 |

OTHER PUBLICATIONS

U.S. Appl. No. 14/248,571, filed Apr. 9, 2014, Horgan et al.
English translation of the Chinese Office Action for CN Serial No. CN200810149762.2 dated Nov. 3, 2010; 7 pages.
Non-Final Office Action dated Nov. 14, 2014 in U.S. Appl. No. 13/955,082; 8 pages.

* cited by examiner

SYSTEM AND METHOD FOR CONTROLLING THE AMOUNT OF TORQUE PROVIDED TO WHEELS OF A VEHICLE TO PREVENT UNINTENDED ACCELERATION

CROSS-REFERENCE TO RELATED APPLICATIONS

This application claims the benefit of U.S. Provisional Application No. 61/860,307, filed on Jul. 31, 2013. The disclosure of the above application is incorporated herein by reference in its entirety.

FIELD

The present disclosure relates to internal combustion engines, and more specifically, to systems and methods for controlling the amount of torque provided to wheels of a vehicle to prevent unintended acceleration.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes an axle torque determination module, an engine torque determination module, a torque security module, and an engine torque control module. The axle torque determination module determines an axle torque request based on a driver input and a vehicle speed. The engine torque determination module determines an engine torque request based on the axle torque request and at least one of a first turbine speed and whether a clutch of a torque converter is applied. The torque security module determines a secured torque request based on at least one of the driver input, the vehicle speed, and an engine speed. The engine torque control module controls an amount of torque produced by an engine based on one of the engine torque request and the secured torque request.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A system and method according to the present disclosure may control the amount of torque produced by an engine based on an axle torque request. The system and method may determine the axle torque request based on a pedal position and a vehicle speed. The system and method may determine an engine torque request based on the axle torque request and transmission losses (torque losses in the transmission). The system and method may then control the amount of torque produced by the engine based on the engine torque request.

The system and method may determine the transmission losses based on a transmission gear, a turbine speed associated with the torque converter, and whether a torque converter clutch is applied. Thus, when generating the engine torque request, the system and method accounts for the transmission gear, the turbine speed, and whether the torque converter clutch is applied. In turn, the system and method improves drivability relative to other systems and methods for controlling engine torque.

The transmission gear may be less accurate than a secured parameter such as engine speed or vehicle speed, which may be measured. The system and method may determine the engine torque request by dividing the axle torque request by a gear ratio associated with the transmission gear. Thus, if the transmission gear used to determine the engine torque request is lower than the actual gear, controlling the engine torque output based on the engine torque request may cause unintended acceleration.

A system and method according to present disclosure prevents unintended acceleration by comparing the engine torque request to a secured torque request. If the engine torque request is less than or equal to the secured torque request, the system and method controls the amount of torque produced by the engine based on the engine torque request. If the engine torque request is greater than the secured torque request, the system and method controls the amount of torque produced by the engine based on the secured torque request.

The secured torque request may be a maximum value of a first secured torque request and a second secured torque request. The system and method may determine the first secured torque request based on an engine power request and the engine speed. The system and method may determine the engine power request based on the pedal position and the vehicle speed.

The system and method may determine the second secured torque request based on the axle torque, an estimated transmission gear, and an estimated turbine speed. The system and method may estimate the transmission gear based on the engine speed and the vehicle speed. The system and method may estimate the turbine speed based on the vehicle speed and the estimated transmission gear.

Figure 1:
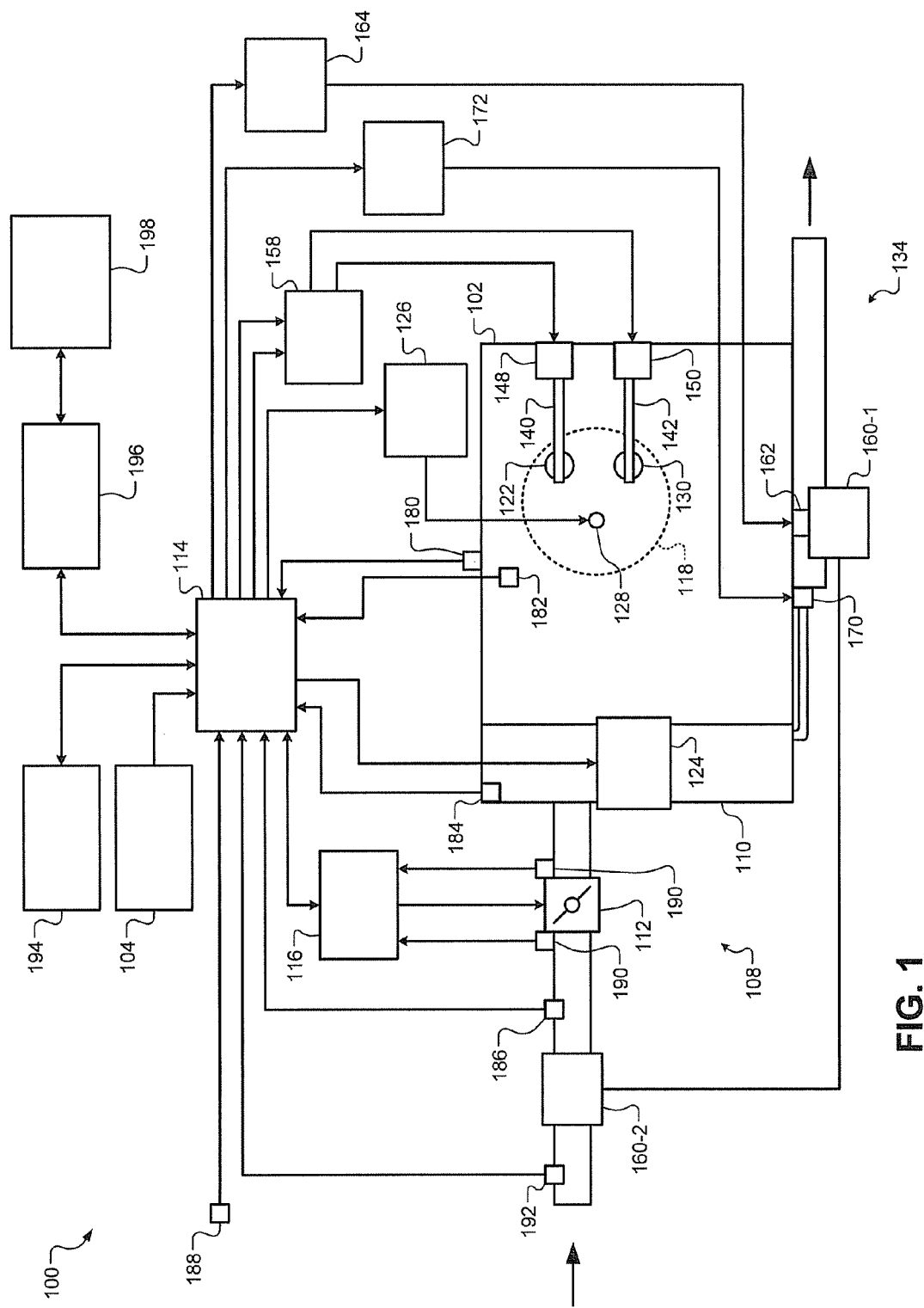
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on cruise control system, which may be an adaptive cruise control system that varies vehicle speed to maintain a predetermined following distance.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including, the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148, 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 by decoupling the intake valve 122 from the intake cam phaser 148. Similarly, the valve actuator module 158 may disable opening of the exhaust valve 130 by decoupling the exhaust valve 130 from the exhaust cam phaser 150. In various implementations, the valve actuator module 158 may control the intake valve 122 and/or the exhaust valve 130 using devices other than camshafts, such as electromagnetic or electrohydraulic actuators.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes, a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112. The speed of the vehicle may be measured using a vehicle speed (VS) sensor 188, which may be located at a wheel of the vehicle.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module (TCM) 194 to coordinate shifting gears in a transmission (not shown). For example, the ECM 114 may reduce engine torque during a gear shift. The ECM 114 may communicate with a hybrid control module (HCM) 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114, the TCM 194, and the HCM 196 may be integrated into one or more modules.

A torque converter (not shown) may be used to hydraulically couple the engine 102 to the transmission. The torque converter may include an impeller and a turbine. The impeller may be mechanically coupled to the engine 102. The turbine may be hydraulically coupled to the impeller and may drive the transmission. The torque converter may also include a lock-up clutch that locks the turbine to the impeller, mechanically coupling the impeller and the turbine. The speed of the turbine may be measured using a turbine speed sensor (not shown), which may output the turbine speed to the TCM 194.

Figure 2:
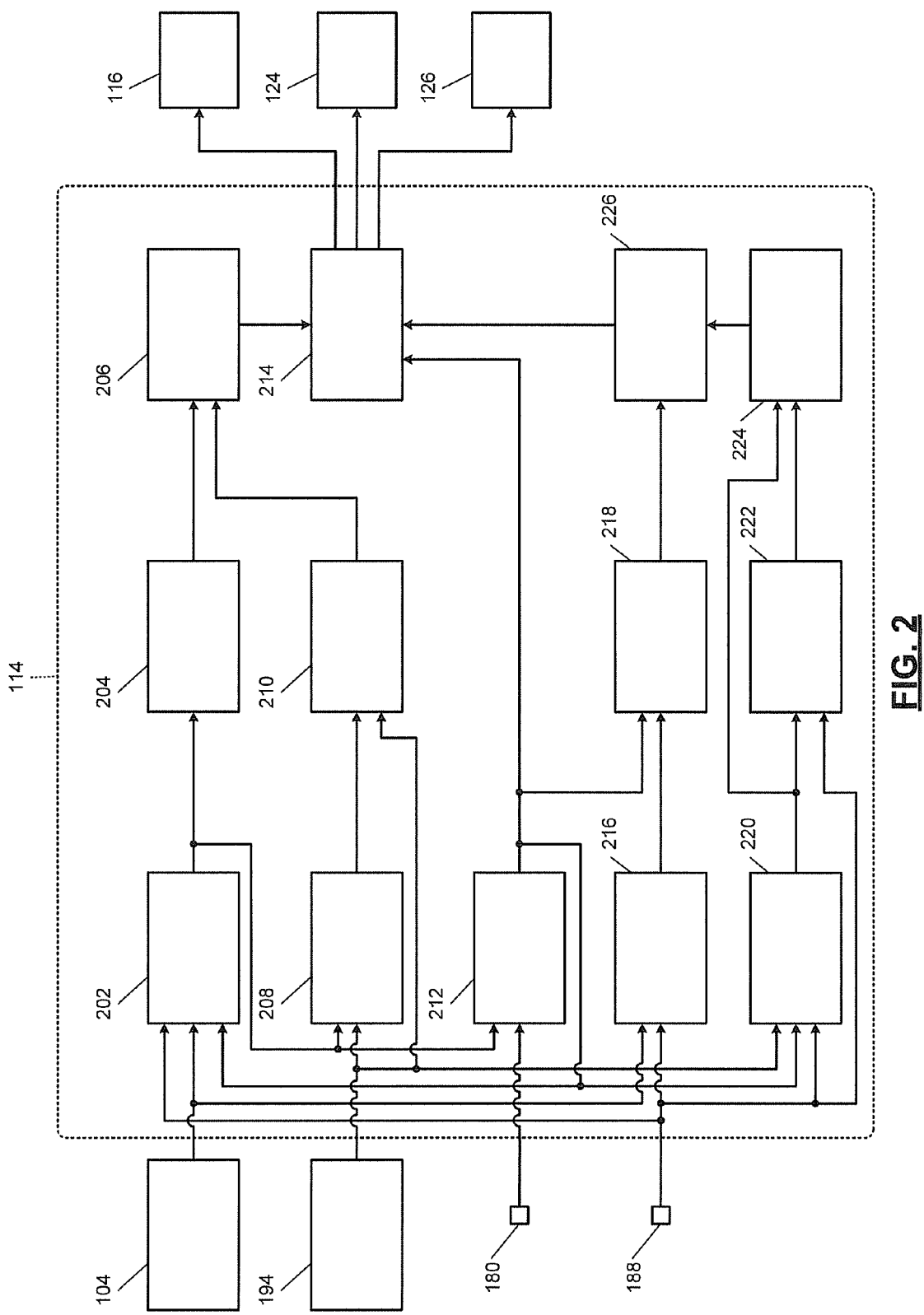
FIG. 2 is a functional block diagram of an example control system according to the principles of the present disclosure.

Referring now to FIG. 2, an example implementation of the ECM 114 includes an axle torque determination module 202, an axle torque adjustment module 204, and an engine torque determination module 206. The axle torque determination module 202 determines an axle torque request based on the driver input from the driver input module 104 and the vehicle speed from the VS sensor 188. The axle torque determination module 202 may determine the axle torque request based on a relationship such as $$T_{axl} = T_{acc}(PP, VS) + ZPT \qquad (1)$$

where $T_{acc}$ is an acceleration torque, PP is the pedal position, VS is the vehicle speed, and ZPT is a zero pedal torque. This relationship may be embodied as an equation and/or a lookup table.

The acceleration torque is an amount of axle torque (torque at wheels) required to achieve a desired acceleration of the vehicle. As relationship (1) indicates, the acceleration torque is a function of the pedal position and the vehicle speed. The zero pedal torque may be used to control the amount of torque produced by the engine 102 when a driver removes their foot from the accelerator pedal, as discussed in more detail below.

The acceleration torque may be determined based on a relationship such as $$T_{acc} = \text{ACCEL}(PP, VS) * M * R \qquad (2)$$

where ACCEL is the desired acceleration of the vehicle, M is a mass of the vehicle, and R is a radius of the wheels. This relationship may be embodied as an equation and/or a lookup table. As relationship (2) indicates, the desired acceleration is a function of the pedal position and the vehicle speed. The axle torque determination module 202 outputs the axle torque.

The axle torque adjustment module 204 adjusts the axle torque request based on an actual response of a powertrain system and a desired response of the powertrain system. The powertrain system may include the engine 102, the transmission, the torque converter, and a driveline (not shown) coupling the transmission to the wheels. A first order response of the powertrain system may be equal to a period from a first time when an axle torque is commanded to a second time when 90 percent of the axle torque is achieved. The first order response may be characterized using a time constant equal to one-third of the first order response. The axle torque adjustment module 204 may determine an adjusted axle torque request based on a relationship such as $$T_{axl\_adj} = \frac{\tau_{act} * s + 1}{\tau_{des} * s + 1} * T_{axl} \qquad (3)$$

where $T_{act}$ is an actual time constant of a powertrain system response, $T_{des}$ is a desired time constant of the powertrain system response, and s is a complex argument of a Laplace Transform.

The actual time constant may be determined based on a function of engine speed and a ratio of a commanded torque to a maximum torque at the engine speed. This function may be embodied as an equation and/or a lookup table. In addition, this function may be predetermined by placing the powertrain system on a dynamometer. Alternatively, the axle torque adjustment module 204 may estimate the actual time constant in real-time based on the first order response of the powertrain system. The desired torque may be determined based on a function of vehicle speed and a desired axle torque. This function may be embodied as an equation and/or a lookup table, and may be predetermined with the goal of improving drivability.

The engine torque determination module 206 determines an engine torque request based on the adjusted axle torque request. The engine torque determination module 206 may determine the engine torque request based on a relationship such as $$T_{eng} = \frac{T_{axl\_adj} + OFF}{SC} \quad (4)$$

where $T_{eng}$ is the engine torque request, OFF is an offset, and SC is a scalar. This relationship may be embodied as an equation and/or a lookup table. The offset and the scalar may be a measure of transmission losses, as discussed in more detail below.

A desired engine speed module 208 determines a desired engine speed based on the axle torque request determined by the axle torque determination module 202, a transmission gear, and a turbine speed. For example, when the torque converter clutch is not applied, the desired engine speed module 208 may determine the desired engine speed based on a relationship such as $$N_{eng\_des} = f(T_{axl}, N_{turb}, \text{Gear}) \quad (5)$$

where $N_{eng\_des}$ is the desired engine speed, $N_{turb}$ is the turbine speed, and Gear is the transmission gear. This relationship may be embodied as an equation and/or a lookup table. The desired engine speed module 208 may receive the transmission gear and the turbine speed from the TCM 194.

In one example, relationship (5) may be embodied in an equation such as $$\frac{T_{axl} + SL(\text{Gear})}{\eta_E * \eta_R * TR\left(\frac{N_{turb}}{N_{eng\_des}}\right)} = \frac{N_{eng\_des}^2}{k^2\left(\frac{N_{turb}}{N_{eng\_des}}\right)} \quad (6)$$

where SL is total spin losses of the powertrain system, $\eta_E$ is the efficiency of the transmission, and $\eta_R$ is the torque ratio of the transmission, transfer case (not shown), and differential (not shown), TR is the torque ratio of the torque converter, and k is a factor. As equation (6) indicates, the total spin losses may be a function of the transmission gear, while the torque converter torque ratio and the k factor may be a function of a ratio of the turbine speed to the desired engine speed. The transmission efficiency, the transmission torque ratio, and the k factor may be predetermined by, for example, placing the powertrain system on a dynamometer. In one example, the k factor may be equal to the engine speed divided by the square root of the torque output of the engine 102. Equation (6) may be solved offline in an iterative manner and the results may be stored in a lookup table. Then, using the lookup table, the desired engine speed may be determined in real-time based on the axle torque request, the transmission gear, and the turbine speed.

In another example, when the torque converter clutch is applied, the desired engine speed module 208 may determine the desired engine speed based on a relationship such as $$N_{eng\_des} = N_{turb} + \text{Slip}_{des} \quad (7)$$

where $\text{Slip}_{des}$ is a desired slip in the torque converter. Torque converter slip is equal to a difference between the engine speed and the turbine speed. The desired engine speed module 208 may receive the desired slip from the TCM 194. The TCM 194 may adjust the desired slip to improve fuel economy and reduce vibration.

A transmission losses module 210 determines the scalar and the offset that are used by the engine torque determination module 206 to determine the engine torque. The transmission losses module 210 may determine the scalar based on a relationship such as $$SC = \eta_E * \eta_R * TR\left(\frac{N_{turb}}{N_{eng\_des}}\right) \quad (8)$$

The transmission losses module 210 may determine the offset based on a relationship such as $$OFF = SL(\text{Gear}) \quad (9)$$

The transmission losses module 210 may receive the turbine speed and the transmission gear from the TCM 194.

An engine speed control module 212 outputs an engine torque request to control engine speed. The engine speed control module 212 may set the engine torque request equal to the zero pedal torque when the ECM 114 transitions from a torque control mode to a speed control mode, such as when a driver removes their foot from the accelerator pedal. The engine speed control module 212 may output the zero pedal torque when the axle torque request from the axle torque determination module 202 is less than a threshold (e.g., a predetermined value), indicating that the driver's foot is off the accelerator pedal. The zero pedal torque may be used to control amount of torque produced by the engine 102 only when the engine speed control module 212 outputs the zero pedal torque.

The engine speed control module 212 may adjust the zero pedal torque to reduce the difference between a desired engine speed and an actual engine speed. The engine speed control module 212 may linearly decrease the desired engine speed for vehicle coastdown until an idle speed is reached, and then maintain the desired engine speed at the idle speed. The engine speed control module 212 may determine the actual engine speed based on the crankshaft position from the CKP sensor 180.

An engine torque control module 214 controls the amount of torque produced by the engine 102. The engine torque control module 214 may control the engine torque output based on the engine torque request output by the engine torque determination module 206 when the axle torque request output by the axle torque determination module 202 is greater than or equal to the threshold. The engine torque control module 214 may control the engine torque output based on the engine torque request output by the engine speed control module 212 when the axle torque request output by the axle torque determination module 202 is less than the threshold.

The engine torque control module 214 may control the amount of torque produced by the engine 102 by adjusting a desired throttle area, a desired fueling rate, and/or a desired spark timing. The engine torque control module 214 may output the desired throttle area, the desired fueling rate, and the desired spark timing to the throttle actuator module 116, the fuel actuator module 124, and the spark actuator module 126, respectively. The throttle actuator module 116 may regulate the throttle valve 112 based on the desired throttle area. The fuel actuator module 124 may regulate fuel injection based on the desired fueling rate. The spark actuator module 126 may regulate the spark plug 128 based on the desired spark timing.

An engine power determination module 216 determines an engine power request based on the driver input from the driver input module 104 and the vehicle speed from the VS sensor

188. The engine power determination module 216 may determine the engine power request based on a relationship such as $$P_{eng}(PP,VS) = T_{eng}(PP,VS) * N_{eng\_des}(PP,VS) \qquad (10)$$

where $T_{eng}$ is an engine torque request and $N_{eng\_des}$ is the desired engine speed. The engine torque request in relationship (10) may be different from the engine torque request determined based on relationships (4) through (9). The desired engine speed may be determined based on relationships (5) through (7) as discussed above.

As relationship (10) indicates, the engine torque ET is a function of the pedal position and the vehicle speed. In one example, the engine power determination module 216 may determine the engine torque ET based on a relationship such as $$ET(PP, VS) = \frac{T_{acc}(PP, VS) + SL(\text{Gear})}{\eta_E(\text{Gear}) * \eta_R(\text{Gear}) * TR\left(\frac{N_{turb}}{N_{eng\_des}}\right)} \qquad (11)$$

As relationship (11) indicates, the total spin losses, the transmission efficiency, and the torque ratio $\eta_R$ may be a function of the transmission gear, while the torque ratio TR may be a function of a ratio of the turbine speed to the desired engine speed. The turbine speed may be determined by dividing the vehicle speed by the torque ratio $\eta_R$.

When determining the engine power request, the engine power determination module 216 may assume that the transmission is upshifting. Thus, the engine power determination module 216 may determine the transmission gear based on a transmission upshift schedule, which may include a predetermined mapping of pedal position and vehicle speed to transmission gear. In addition, the engine power determination module 216 may determine whether the torque converter clutch is applied based on a torque converter clutch schedule, which may include a predetermined mapping of pedal position and vehicle speed to the applied state of the torque converter clutch. The torque converter clutch schedule may be a function of whether the transmission is upshifting or downshifting. Since the transmission may not be upshifting, the values in relationships (10) and (11) affected by the assumption that the transmission is upshifting may be different from the corresponding values in relationships (5) through (9).

A first torque security module 218 determines a first secured torque request. The first torque security module 218 may determine the first secured torque request based on the engine power request and the actual engine speed. For example, the first torque security module 218 may determine the first secured torque request using a relationship such as $$T_{eng\_sec1} = \frac{P_{eng}(PP, V)}{N_{eng\_act}} + \Delta T_{max\_eng} \qquad (12)$$

where $\Delta T_{max\_eng}$ is a maximum difference between a secured engine torque request and an engine torque corresponding to the amount of acceleration requested by the driver. This maximum difference may be predetermined and/or may be determined based on the transmission gear.

A gear estimation module 220 estimates the transmission gear. The gear estimation module 220 may estimate the transmission gear based on a first speed ratio and a gear ratio error. The first speed ratio may be equal to a turbine speed corresponding to the lowest gear of the vehicle (e.g., first gear) divided by the actual engine speed. The turbine speed corresponding to the lowest gear of the vehicle may be calculated based on a product of the vehicle speed and a gear ratio $\eta_k$, which may be a function of the assumed gear (e.g., first gear).

The gear ratio error may be equal to a difference between a measured gear ratio of the transmission and a commanded gear ratio of the transmission. The measured gear ratio may be determined based on a transmission input shaft speed and a transmission output shaft speed. The transmission input shaft speed may be determined based on the engine speed and the gear ratio of the torque converter. The transmission output shaft speed may be determined based on the vehicle speed and the gear ratio of the transfer case and the differential. The commanded gear ratio may be determined based on a commanded gear. The gear estimation module 220 may receive the commanded gear from the TCM 194.

When estimating the transmission gear, the gear estimation module 220 may determine whether the first speed ratio and the gear ratio error satisfy certain conditions. The conditions may depend on whether a transmission shift is in progress. The gear estimation module 220 may determine whether a shift is in progress based on an input received from the TCM 194.

If a shift is not in progress, the gear estimation module 220 may determine whether the gear ratio error is less than a threshold and whether the first speed ratio is within a predetermined range. If the gear ratio error is less than the threshold and the first speed ratio is within the predetermined range, the gear estimation module 220 may increase a counter. If the counter is greater than or equal to a predetermined count, the gear estimation module 220 may set the estimated gear equal to the commanded gear.

If the gear ratio error is greater than the threshold and/or the first speed ratio is outside of the predetermined range, the gear estimation module 220 may set the estimated gear equal to the lowest possible gear. The gear estimation module 220 may determine the lowest possible gear by comparing the first speed ratio to predetermined ranges associated with each gear. The gear estimation module 220 may include a gear in a set of possible gears when the first speed ratio is within a predetermined range associated with the gear.

If a shift is in progress, the gear estimation module 220 may determine whether the measured gear ratio is within a first range, whether the gear ratio error is less than a first threshold, and whether the first speed ratio is within a predetermined range. The first range may be between a lower limit and an upper limit. The lower limit may be equal to a difference between the commanded gear ratio and a second threshold. The upper limit may be a sum of an estimated gear ratio and a third threshold. The estimated gear ratio may be determined based on the estimated transmission gear in a previous iteration loop.

If the measured gear ratio is within the first range, the gear ratio error is less than the first threshold, and the first speed ratio is within the predetermined range, the gear estimation module 220 may increase a counter. Otherwise, the gear estimation module 220 may estimate the transmission gear based on other criteria. If the counter is greater than or equal to a predetermined count, the gear estimation module 220 may set the estimated gear equal to the commanded gear.

The gear estimation module 220 may determine whether the measured gear ratio is within the first range, whether a previous gear ratio error is less than a second threshold, and whether the first speed ratio is within a predetermined range. The previous gear ratio error is a gear ratio error determined in a previous iteration loop. If the measured gear ratio is within the first range, the previous gear ratio error is less than the second threshold, and the first speed ratio is within the predetermined range, the gear estimation module 220 may set the estimated gear equal to the estimated gear from the previous iteration loop.

A turbine speed estimation module 222 estimates the turbine speed. The turbine speed estimation module 222 may estimate the turbine speed by dividing the vehicle speed by the transmission gear ratio. The transmission gear ratio may be determined based on the estimated transmission gear. For example, each gear in the transmission may be associated with a predetermined gear ratio.

A second torque security module 224 determines a second secured torque request. The second torque security module may determine the second secured torque request based on the estimated transmission gear and the estimated turbine speed. For example, the second torque security module may determine the second secured torque request based on a relationship such as $$T_{eng\_sec2} = \frac{T_{axl\_adj}(PP, V) + SL(Gear_{est}) + \Delta T_{max\_axl}}{\eta_E(Gear_{est}) * \eta_R(Gear_{est}) * TR\left(\frac{(N_{turb})_{est}}{N_{eng\_des}}\right)} \quad (13)$$

where $\Delta T_{max\_axl}$ is a maximum difference between a secured engine torque request and an axle torque corresponding to the amount of acceleration requested by the driver. This maximum difference may be predetermined and/or may be determined based on the transmission gear.

A third torque security module 226 determines a third secured torque request based on the first and second secured torque requests. The third torque security module 226 may set the third secured torque request equal to a maximum value of the first and second secured torque requests. In various implementations, the first torque security module 218, the second torque security module 224, and/or the third torque security module 226 may be implemented in a single torque security module.

The engine torque control module 214 may compare the third secured torque request to the engine torque request output by the engine torque determination module 206. The engine torque control module 214 may control the engine torque output based on the engine torque request when the engine torque request is less than or equal to the third secured torque request. The engine torque control module 214 may control the engine torque output based on the third secured torque request when the engine torque request is greater than the third secured torque request.

Figure 3:
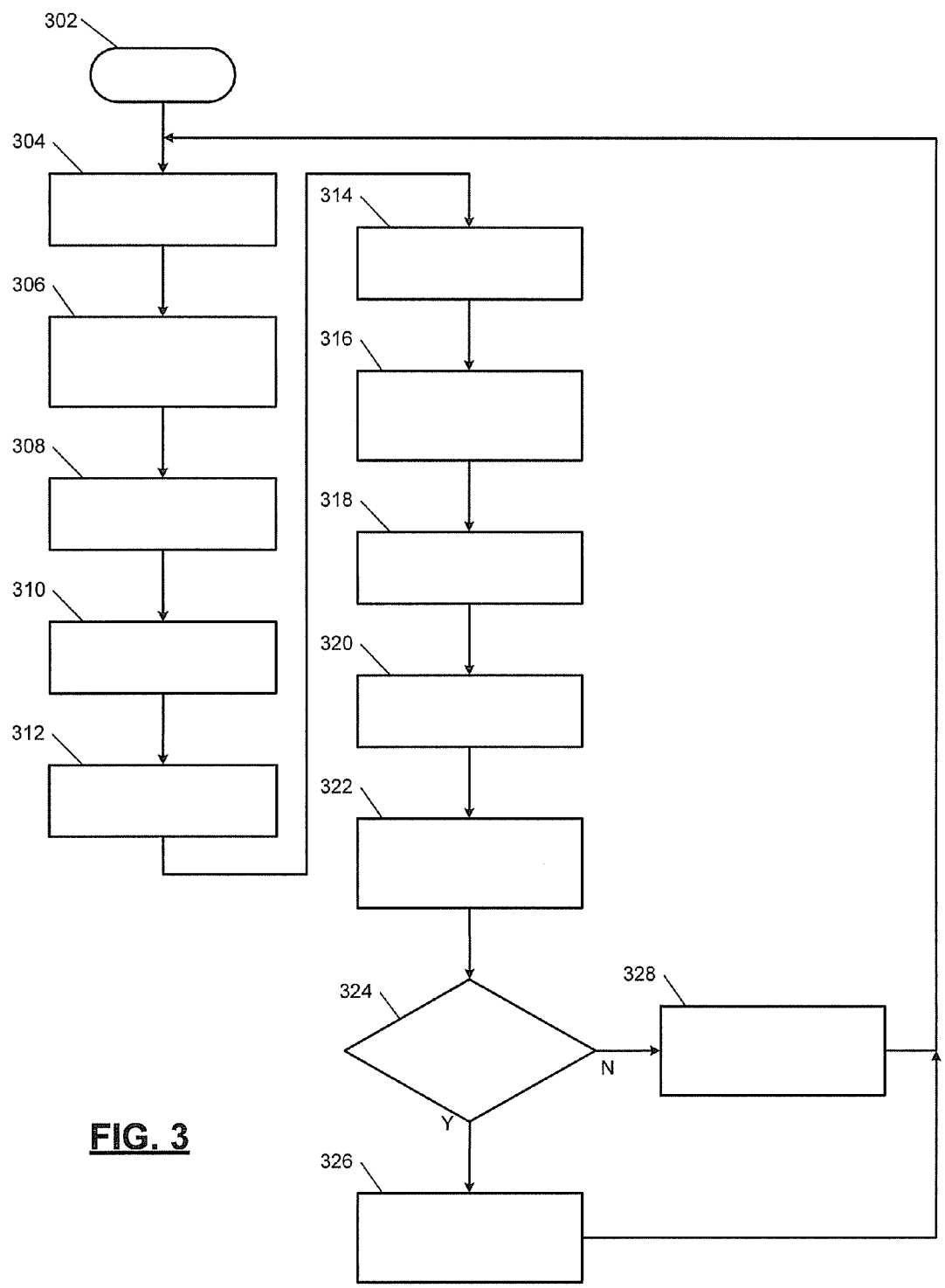
FIG. 3 is a flowchart illustrating an example control method according to the principles of the present disclosure.

Referring now to FIG. 3, a method for controlling axle torque (torque at wheels) begins at 302. At 304, the method determines an axle torque request based on a pedal position, a vehicle speed, and the zero pedal torque. For example, the method may determine the axle torque request using relationships (1) and (2) as discussed above. At 306, the method adjusts the axle torque request based on the response time of a powertrain system. The powertrain system may include the engine, a transmission, a torque converter that hydraulically couples the engine to the transmission, and a driveline that couples the transmission to wheels of a vehicle. In one example, the method may adjust the axle torque request using relationship (3) as discussed above.

At 308, the method determines a desired engine speed. When a torque converter clutch is not applied, the method may determine the desired engine speed based on relationships (5) and (6) as described above. Otherwise, the method may determine the desired engine speed based on relationship (7) as described above. The torque converter clutch may be used to mechanically couple a turbine of the torque converter to an impeller of the torque converter. The impeller may be mechanically coupled to the engine. The turbine may be mechanically coupled to the transmission.

As 310, the method determines a scalar and an offset that indicate transmission losses. The method may determine the scalar based on turbine speed and the desired engine speed using relationship (8) as discussed above. The method may determine the offset based on a transmission gear using relationship (9) as discussed above.

At 312, the method determines an engine torque request. The method may determine the engine torque request based on the adjusted axle torque, the scalar, and the offset. For example, the method may determine the engine torque request using relationship (4) as discussed above.

At 314, the method determines an engine power request. The method may determine the engine power request based on the pedal position, the vehicle speed, and the transmission gear. For example, the method may determine the engine power request using relationships (10) and (11) as discussed above. When determining the engine power request, the method may assume that the transmission is upshifting and that the torque converter clutch is applied. Thus, the method may determine the transmission gear based on a transmission upshift schedule, which may be a predetermined mapping of pedal position and vehicle speed to transmission gear.

At 316, the method determines a first secured torque request. The method may determine the first secured torque request based on the engine power request and the actual engine speed. For example, the method may determine the first secured torque request using relationship (12) as discussed above.

At 318, the method estimates the transmission gear. The method may estimate the transmission gear based on the actual engine speed and the vehicle speed as discussed above with respect to the gear estimation module 220 of FIG. 2. At 320, the method estimates a turbine speed. The method may estimate the turbine speed by dividing the vehicle speed by a gear ratio associated with the estimated gear.

At 322, the method determines a second secured torque request. The method may determine the second secured torque request based on the adjusted axle torque, the estimated transmission gear, and the estimated turbine speed. For example, the method may determine the second secured torque request using relationship (13) as discussed above.

At 324, the method determines whether the engine torque request is less than or equal to a maximum of the first secured torque request and the second secured torque request. When the engine torque request is less than or equal to the maximum secured torque request, the method continues at 326. Otherwise, the method continues at 328. At 326, the method controls the engine based on the engine torque request. At 328, the method controls the engine based on the maximum secured torque request.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
    an axle torque determination module that determines an axle torque request based on a driver input and a vehicle speed;
    an engine torque determination module that determines an engine torque request based on the axle torque request and at least one of a first turbine speed and whether a clutch of a torque converter is applied;
    a torque security module that determines a secured torque request based on at least one of the driver input, the vehicle speed, and an engine speed; and
    an engine torque control module that controls an amount of torque produced by an engine based on one of the engine torque request and the secured torque request.

2. The system of claim 1 wherein the engine torque control module controls the amount of torque produced by the engine based on the engine torque request when the engine torque request is less than or equal to the secured torque request.

3. The system of claim 2 wherein the engine torque control module controls the amount of torque produced by the engine based on the secured torque request when the engine torque request is greater than the secured torque request.

4. The system of claim 3 wherein the torque security module determines the secured torque request based on a maximum value of a first secured torque request and a second secured torque request.

5. The system of claim 4 wherein the torque security module determines the first secured torque request based on an engine power request and the engine speed.

6. The system of claim 5 further comprising an engine power request module that determines the engine power request based on the driver input and the vehicle speed.

7. The system of claim 6 wherein the engine power request module:
    determines a transmission gear based on the driver input and the vehicle speed; and
    determines the engine power request based on the transmission gear.

8. The system of claim 4 wherein the torque security module determines the second secured torque request based on the axle torque request, a transmission gear, and a second turbine speed.

9. The system of claim 8 further comprising a transmission gear estimation module that estimates the transmission gear based on the engine speed and the vehicle speed.

10. The system of claim 9 further comprising a turbine speed estimation module that estimates the second turbine speed based on the vehicle speed and the estimated transmission gear.

11. A method comprising:
    determining an axle torque request based on a driver input and a vehicle speed;
    determining an engine torque request based on the axle torque request and at least one of a first turbine speed and whether a clutch of a torque converter is applied;
    determining a secured torque request based on at least one of the driver input, the vehicle speed, and an engine speed; and
    controlling an amount of torque produced by an engine based on one of the engine torque request and the secured torque request.

12. The method of claim 11 further comprising controlling the amount of torque produced by the engine based on the engine torque request when the engine torque request is less than or equal to the secured torque request.

13. The method of claim 12 further comprising controlling the amount of torque produced by the engine based on the secured torque request when the engine torque request is greater than the secured torque request.

14. The method of claim 13 further comprising determining the secured torque request based on a maximum value of a first secured torque request and a second secured torque request.

15. The method of claim 14 further comprising determining the first secured torque request based on an engine power request and the engine speed.

16. The method of claim 15 further comprising determining the engine power request based on the driver input and the vehicle speed.

17. The method of claim 16 further comprising:
    determining a transmission gear based on the driver input and the vehicle speed; and
    determining the engine power request based on the transmission gear.

18. The method of claim 14 further comprising determining the second secured torque request based on the axle torque request, a transmission gear, and a second turbine speed.

19. The method of claim 18 further comprising estimating the transmission gear based on the engine speed and the vehicle speed.

20. The method of claim 19 further comprising estimating the second turbine speed based on the vehicle speed and the estimated transmission gear.

* * * * *